United States Patent Office 2,789,049
Patented Apr. 16, 1957

2,789,049
HIGH STRENGTH WELDING STEEL

William T. De Long, West Manchester Township, York County, and Gustaf A. Ostrom, Paradise Township, York County, Pa., assignors to The McKay Company, Pittsburgh, Pa., a corporation of Pennsylvania No Drawing. Application November 3, 1954, Serial No. 466,662

4 Claims. (Cl. 75—126)

This invention relates to welding steel, i. e., steel which can be weld-deposited, which has important improved characteristics. Our improved welding steel is superior to previously existing welding steels in strength and has other superior properties.

Those skilled in the art are engaged in an unceasing search for materials with higher strength than those now known. Three welding steels selected for their high strength which are now used "as welded" are described in Table I.

TABLE I
*Prior high strength welding steels*

| No | 1 | 2 | 3 |
|---|---|---|---|
| Type | 349 19–9 WMo | 312 29–9 | Navy Grade 260 |
| Structure | Austenitic-ferritic | Austenitic-ferritic | Ferritic steel |
| Analysis (typical): | | | |
| C (percent) | .10 | .11 | .07 |
| Mn (percent) | 1.8 | 1.8 | .8 |
| Cr (percent) | 19.5 | 28.0 | 0 |
| Ni (percent) | 9.0 | 9.5 | 1.5 |
| Mo (percent) | .50 | 0 | .5 |
| V (percent) | 0 | 0 | .2 |
| Cb (percent) | 1.00 | 0 | 0 |
| W (percent) | 1.50 | 0 | 0 |
| All weld metal tensile bolt properties: | | | |
| Tensile Strength (lbs./sq. in.) | 110,000 | 110,000 | 120,000 |
| Yield Strength (lbs./sq. in.) | 85,000 | 85,000 | 110,000 |
| Elongation (percent) | 30 | 32 | 20 |

The strength levels shown in Table I are considered very superior for welding steel.

We have discovered that superior strength can be developed in welding steel by the proper balancing of chromium, manganese and nickel, coupled with carbon and nitrogen within defined limits, and that further improvement in properties can be obtained by addition of molybdenum and/or tungsten, and/or vanadium and/or columbium within defined limits.

To obtain the benefits of our invention the chromium content of the welding steel should be in the range 11–21% while the manganese is in the range 9–19%, and when to this base area of chromium and manganese carbon and alloy additions are made within defined limits a welding steel of unprecedented strength coupled with other desirable properties is produced. A narrower preferred base area is chromium 14–19% and manganese 14–18%. The effect of carbon, chromium, manganese, nickel and alloy additions has been studied extensively to find the approximate limits within which the benefits of our invention are obtained. Table II shows the broad and preferred ranges of elements for accomplishing our improved results.

TABLE II

| | Broad Range, percent | Preferred Range, percent |
|---|---|---|
| C | .20 to .60 | .35 to .55 |
| Mn | 9 to 19 | 14 to 18 |
| Ni | 0 to 4 | 0 to 2 |
| Mn+2Ni | 13 to 22 | 16 to 22 |
| Cr | 11 to 21 | 14 to 19 |
| N | 0 to .30 | .10 to .25 |
| Mo and/or W | 0 to 5 | 0 to 5 |
| V and/or Cb | 0 to 2 | 0 to 2 |
| Mo and/or W+2 (V and/or Cb) | 20 (C*—.50) to 20 (C—.10) | 20 (C—.40) to 20 (C—.20) |

*C stands for percent of carbon in the alloy. Only positive values of the parenthetical expressions in this line are significant; negative values are treated as zero.

We have found that two relationships are important. The first is the balance between the austenitizers (C, Mn, Ni, N) and the ferritizers (Cr, Si, W, Mo, Cb, V). This balance must be adequate to produce a strong matrix. With all the austenitizers near the low limits of their ranges and the ferritizers near the high limits of their ranges the mechanical properties are little or no better than those of the modified 18–8 type welding steels. For this reason limits as to the effective sum of the manganese and the nickel are included in Table II. The total value of manganese plus 2 nickel defines the effect of the two in the alloy in accordance with standard metallurgical practice in relation to austenitic alloys.

The second important relationship is that between carbon and the strong carbide formers (W, Mo, Cb, V). To illustrate, assume that an optimum balance has been found between the austenitizers and ferritizers to form a good matrix; as more strong carbide former is added carbon should be added in small amounts to maintain the alloy balance. Guidance for maintaining the required relationship is given in Table II in which the quantities of molybdenum and/or tungsten, and/or vanadium and/or columbium which may be employed are specified as a function of the carbon content. Carbon and nitrogen exert their usual strong austenitizing action and the carbon range specified is needed to maintain the strength developed in the welding steel. In our welding steel vanadium is approximately twice as powerful as molybdenum. Tungsten and columbium can be substituted respectively for all or part of the molybdenum and vanadium. The limits for molybdenum and/or tungsten plus 2 vanadium and/or columbium are set as a function of the carbon content by positive values of the expressions given; negative values are treated as zero.

With regard to other elements, the austenitizers copper and cobalt may be present in limited quantities. Silicon will normally be present in quantities up to 1.5 or even 2% since it is present in the commercial material available as core wire and is usually used as a deoxidizer in the coatings of coated welding electrodes. Other strong carbide formers such as tantalum or titanium could theoretically be substituted for the carbide formers listed but are hard to recover in weld deposits.

The strength levels of our improved welding steel are substantially higher than those in the prior high strength welding steels of Table I. Specific examples of our improved welding steels are given in Table III.

TABLE III

*Improved high strength welding steels*

| No. | 4 | 5 | 6 |
|---|---|---|---|
| C (percent) | .40 | .50 | .40 |
| Cr (percent) | 16 | 16 | 16 |
| Mn (percent) | 16 | 16 | 16 |
| Ni (percent) | 1 | 1 | 1 |
| N (percent) | .15 | .15 | .15 |
| Mo (percent) | 0 | 2 | 2 |
| V (percent) | .8 | .8 | .8 |
| Tensile (lbs./sq. in.) | 144,000 | 152,000 | 144,000 |
| Yield (lbs./sq. in.) | 117,000 | 120,000 | 121,000 |
| Elongation (percent) | 24 | 23 | 21 |

It will be noted that our steels of Table III are of very high strength, this being due to the employment of alloying elements in the above-defined base areas of the primary elements.

The deposit analyses disclosed can be produced by the various methods of manual and automatic welding, as, for example, shielded arc, inert arc, submerged arc or acetylene.

While we have described certain present preferred embodiments of the invention it is to be distinctly understood that the invention is not limited thereto but may be otherwise variously embodied within the scope of the following claims.

We claim:

1. A weld deposit possessed of high strength having substantially the following composition:

|   | Percent |
|---|---|
| C | .20 to .60 |
| Mn | 9 to 19 |
| Ni | 0 to 4 |
| Mn+2Ni | 13 to 22 |
| Cr | 11 to 21 |
| N | 0 to .30 |
| Mo and/or W | 0 to 5 |
| V and/or Cb | 0 to 2 |
| Mo and/or W+2(V and/or Cb) | 20(C−.50) to 20(C−.10) | in which, in the expressions C−.50 and C−.10, "C" stands for the percent of carbon in the welding steel and only positive values of such expressions are significant, negative values being treated as zero; the balance, except for impurities which do not substantially affect the properties of the steel, being iron.

2. A weld deposit possessed of high strength having substantially the following composition:

|   | Percent |
|---|---|
| C | .35 to .55 |
| Mn | 14 to 18 |
| Ni | 0 to 2 |
| Mn+2Ni | 16 to 22 |
| Cr | 14 to 19 |
| N | .10 to .25 |
| Mo and/or W | 0 to 5 |
| V and/or Cb | 0 to 2 |
| Mo and/or W+2(V and/or Cb) | 20(C−.40) to 20(C−.20) | in which, in the expressions C−.40 and C−.20, "C" stands for the percent of carbon in the welding steel and only positive values of such expressions are significant, negative values being treated as zero; the balance, except for impurities which do not substantially affect the properties of the steel, being iron.

3. A structure comprising metal elements welded together, the weld being possessed of high strength and having substantially the following composition:

|   | Percent |
|---|---|
| C | .20 to .60 |
| Mn | 9 to 19 |
| Ni | 0 to 4 |
| Mn+2Ni | 13 to 22 |
| Cr | 11 to 21 |
| N | 0 to .30 |
| Mo and/or W | 0 to 5 |
| V and/or Cb | 0 to 2 |
| Mo and/or W+2(V and/or Cb) | 20(C−.50) to 20(C−.10) | in which, in the expressions C−.50 and C−.10, "C" stands for the percent of carbon in the welding steel and only positive values of such expressions are significant, negative values being treated as zero; the balance, except for impurities which do not substantially affect the properties of the steel, being iron.

4. A structure comprising metal elements welded together, the weld being possessed of high strength and having substantially the following composition:

|   | Percent |
|---|---|
| C | .35 to .55 |
| Mn | 14 to 18 |
| Ni | 0 to 2 |
| Mn+2Ni | 16 to 22 |
| Cr | 14 to 19 |
| N | .10 to .25 |
| Mo and/or W | 0 to 5 |
| V and/or Cb | 0 to 2 |
| Mo and/or W+2(V and/or Cb) | 20(C−.40) to 20(C−.20) | in which, in the expressions C−.40 and C−.20, "C" stands for the percent of carbon in the welding steel and only positive values of such expressions are significant, negative values being treated as zero; the balance, except for impurities which do not substantially affect the properties of the steel, being iron.

References Cited in the file of this patent

UNITED STATES PATENTS

| 2,698,785 | Jennings | Jan. 4, 1955 |

FOREIGN PATENTS

| 354,976 | Italy | Dec. 15, 1937 |